(12) United States Patent
Uwano et al.

(10) Patent No.: US 11,143,257 B2
(45) Date of Patent: Oct. 12, 2021

(54) STEEL WIRE FOR SPRING

(71) Applicant: Sumitomo (SEI) Steel Wire Corp., Itami (JP)

(72) Inventors: Takafumi Uwano, Itami (JP); Taketoshi Sasaki, Itami (JP); Takao Yamazaki, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 216 days.

(21) Appl. No.: 16/087,259

(22) PCT Filed: Jan. 24, 2017

(86) PCT No.: PCT/JP2017/002227
§ 371 (c)(1),
(2) Date: Sep. 21, 2018

(87) PCT Pub. No.: WO2017/163579
PCT Pub. Date: Sep. 28, 2017

(65) Prior Publication Data
US 2019/0101176 A1    Apr. 4, 2019

(30) Foreign Application Priority Data

Mar. 22, 2016    (JP) .............................. JP2016-057419

(51) Int. Cl.
*F16F 1/02*    (2006.01)
*C22C 38/00*    (2006.01)
(Continued)

(52) U.S. Cl.
CPC ................. *F16F 1/021* (2013.01); *B21C 9/02* (2013.01); *C21D 9/02* (2013.01); *C22C 38/00* (2013.01);
(Continued)

(58) Field of Classification Search
CPC ............... F16F 1/021; B21C 9/02; C21D 9/02
(Continued)

(56) References Cited

U.S. PATENT DOCUMENTS

| 5,152,851 A | * | 10/1992 | Yamamoto | ............... C21D 9/02 148/333 |
| 5,904,830 A | * | 5/1999 | Yamao | .................. C22C 38/001 205/640 |
| 6,527,883 B1 | * | 3/2003 | Kawabe | .................... C21D 1/30 148/580 |
| 6,627,005 B1 | * | 9/2003 | Kawabe | .................... C21D 7/06 148/226 |

(Continued)

FOREIGN PATENT DOCUMENTS

| CN | 1745195 A | | 3/2006 | |
| CN | 101208162 A | * | 6/2008 | ............... C25D 5/22 |

(Continued)

OTHER PUBLICATIONS

Translation EP-0656427-A1 (Year: 1995).*
Translation JP-2011219829-A (Year: 2011).*
Translation CN-101208162-A (Year: 2008).*

*Primary Examiner* — Coris Fung
*Assistant Examiner* — Danielle Carda
(74) *Attorney, Agent, or Firm* — Baker Botts L.L.P.; Michael A. Sartori (57) ABSTRACT

A steel wire for a spring includes a steel wire that has Ca or Na adhered thereto in an amount of 0.2 g/m² or less. The steel wire has an oxide film on a surface thereof, and the oxide film has a thickness of, for example, from 2.0 μm to 20 μm.

5 Claims, 6 Drawing Sheets

(51) Int. Cl.
   *C23C 8/10* (2006.01)
   *B21C 9/02* (2006.01)
   *C23C 28/00* (2006.01)
   *C23C 8/80* (2006.01)
   *C21D 9/02* (2006.01)
   *C23C 8/14* (2006.01)
   *C22C 38/04* (2006.01)
   *C22C 38/02* (2006.01)
   *C21D 1/18* (2006.01)

(52) U.S. Cl.
   CPC .............. *C23C 8/10* (2013.01); *C23C 8/14* (2013.01); *C23C 8/80* (2013.01); *C23C 28/00* (2013.01); *F16F 1/02* (2013.01); *F16F 1/024* (2013.01); *C21D 1/18* (2013.01); *C22C 38/02* (2013.01); *C22C 38/04* (2013.01); *F16F 2226/02* (2013.01); *F16F 2238/026* (2013.01)

(58) Field of Classification Search
   USPC ........................................................ 148/580
   See application file for complete search history.

(56) References Cited

U.S. PATENT DOCUMENTS

| | | | |
|---|---|---|---|
| 7,404,865 B2 * | 7/2008 | Izumida | C21D 9/02 148/325 |
| 7,717,411 B2 * | 5/2010 | Izumida | C22C 38/001 267/166 |
| 2006/0088710 A1 * | 4/2006 | Fujiwara | C23C 30/00 428/364 |
| 2019/0233912 A1 * | 8/2019 | Okada | C21D 9/02 |

FOREIGN PATENT DOCUMENTS

| | | | | |
|---|---|---|---|---|
| CN | 103060539 A | | 4/2013 | |
| EP | 0656427 A1 | * | 6/1995 | ............ C21D 9/02 |
| JP | 7-188894 A | | 7/1995 | |
| JP | 2000-65110 A | | 3/2000 | |
| JP | 2002-235148 A | | 8/2002 | |
| JP | 2007-185711 A | | 7/2007 | |
| JP | 2011-219829 A | | 11/2011 | |
| JP | 2011219829 A | * | 11/2011 | |

* cited by examiner

STEEL WIRE FOR SPRING

TECHNICAL FIELD

The present invention relates to steel wires for springs.

This application claims priority to Japanese Patent Application No. 2016-057419, filed on Mar. 22, 2016, the entire contents of which are incorporated herein by reference.

BACKGROUND ART

PTL 1 below discloses that nitriding treatment is performed after coiling to improve spring characteristics such as fatigue resistance and settling resistance.

CITATION LIST

Patent Literature

PTL 1: Japanese Unexamined Patent Application Publication No. 7-188894

SUMMARY OF INVENTION

A steel wire for a spring according to one aspect of the present invention has Ca or Na adhered thereto in an amount of 0.2 g/m$^2$ or less.

DESCRIPTION OF EMBODIMENTS

Oil-tempered wires and hard-drawn steel wires such as piano wires and hard steel wires are used as steel wires for springs such as precision springs for electric and electronic devices and valve springs for automotive engines. Steel wires for springs are generally manufactured by patenting and drawing a steel material such as carbon steel or silicon-chromium steel. For oil-tempered wires, drawn steel wires are subjected to quenching and tempering treatment; for hard-drawn steel wires (piano wires and hard steel wires), drawn steel wires are not subjected to quenching and tempering treatment. Steel wires for springs are subjected to coiling to manufacture springs. Typically, nitriding treatment is performed after coiling to improve spring characteristics such as fatigue resistance and settling resistance (see PTL 1 above).

In the process of manufacturing a steel wire for a spring, a lubricant is applied to the surface of a steel wire when the steel wire is drawn. Commonly used lubricants are metallic soaps containing metal hydroxides such as calcium hydroxide (Ca(OH)$_2$) and sodium hydroxide (NaOH) and metal stearates such as calcium stearate (Ca(C$_{17}$H$_{35}$COO)$_2$), typically Ca and Na metal salts.

Technical Problem

During the manufacture of steel wires for springs, heat treatment such as patenting treatment or quenching and tempering treatment may cause the decarburization of the surface of the steel wires. Accordingly, it is desirable to develop a steel wire for a spring with reduced decarburization.

Steel wires for springs are formed into springs with a coiling machine. For thin steel wires for precision springs, any lubricant remaining on the surface of the steel wires during coiling is likely to cause false detection in a length sensor, which may lead to inaccurate measurements of spring free length. In addition, lubricant residue may cause clogging between feed rollers and other members, which may lead to decreased workability and formability into springs.

The present invention has been made in view of the foregoing background. An object of the present invention is to provide a steel wire for a spring with reduced decarburization.

Solution to Problem

A steel wire for a spring according to one aspect of the present invention has Ca or Na adhered thereto in an amount of 0.2 g/m$^2$ or less.

Advantageous Effects of Invention

The steel wire for a spring according to the aspect of the present invention exhibits reduced decarburization.

After conducting extensive research on the cause of the decarburization of steel wires for springs due to heat treatment such as patenting treatment or quenching and tempering treatment, the inventors have made the following findings.

In the process of manufacturing a steel wire for a spring, a lubricant is used when the steel wire is drawn. A Ca or Na metal salt (such as a metal hydroxide or metal stearate), which is a component of the lubricant adhered on the surface of the steel wire, is believed to be the cause of decarburization.

Decarburization due to heat treatment such as patenting treatment or quenching and tempering treatment is believed to occur as follows. If a metal stearate such as Ca(C$_{17}$H$_{35}$COO)$_2$ is adhered on the surface of a steel wire during the heat treatment of the steel wire, the metal stearate is pyrolyzed by the heat treatment to produce carbon dioxide (CO$_2$).

For example, for Ca(C$_{17}$H$_{35}$COO)$_2$, around 440° C.: Ca(C$_{17}$H$_{35}$COO)$_2$→CaCO$_3$+35CO$_2$+35H$_2$O around 680° C.: CaCO$_3$→CaO+CO$_2$ As the carbon dioxide concentration in the furnace increases, the carbon in the steel wire reacts with carbon dioxide (Fe$_3$C+CO$_2$→3Fe+2CO); thus, decarburization is believed to occur and proceed on the surface of the steel wire. The decarburization of the surface of the steel wire increases the ferrite phase in the surface region, which leads to a decrease in quality such as strength.

Furthermore, any lubricant remaining on the surface of a steel wire may be adhered on and cause clogging between feed rollers of a coiling machine during coiling and may also cause other problems such as malfunctions in a sensor such as a length sensor for sensing coil free length, which may lead to decreased workability and formability into springs.

Thus, by reducing the amount of Ca or Na derived from a lubricant component and adhered on the surface of a steel wire, decarburization can be reduced, thus preventing a decrease in quality due to decarburization, and the workability and formability into springs during coiling can also be improved. The present invention has been made based on the foregoing findings. First, the embodiments of the present invention listed below will be described.

[Description of Embodiments of Invention]

(1) A steel wire for a spring according to one aspect of the present invention has Ca or Na adhered thereto in an amount of 0.2 g/m² or less.

Since Ca or Na, which is a component of the lubricant used when the steel wire is drawn, is adhered in an amount of 0.2 g/m² or less, the steel wire for a spring has only a small amount of Ca or Na adhered thereto, thus exhibiting reduced decarburization.

Since Ca or Na is adhered on the surface of the steel wire for a spring in an amount of 0.2 g/m² or less, problems with coiling, such as clogging between feed rollers of a coiling machine and malfunctions in a length sensor, can also be reduced, thus improving the workability and formability into springs (coilability) during coiling.

Here, the steel wire for a spring may have an oxide film on the surface thereof or may have substantially no oxide film. In general, oil-tempered wires have an oxide film formed on the surface thereof, which is primarily due to quenching and tempering treatment; that is, oil-tempered wires include a steel wire body and an oxide film on the surface thereof. On the other hand, hard-drawn steel wires (piano wires and hard steel wires), which are not subjected to quenching and tempering treatment, may have no oxide film; that is, hard-drawn steel wires may be composed only of a steel wire body.

If there is a high frictional resistance between a coiling tool and the steel wire for a spring during coiling using a coiling machine, seizure may occur, which may cause problems such as uneven coiling rate and may thus lead to variations in spring shape (free length and coil diameter) after forming. If the steel wire for a spring has an oxide film on the surface thereof, the oxide film provides better lubricity and therefore less frictional resistance between a coiling tool and the steel wire for a spring. Thus, the formability into springs (coilability) can be improved, which is effective in reducing variations in spring shape.

(2) As one form of the steel wire for a spring, the steel wire for a spring may have a surface roughness Rz of 10 μm or less.

If the steel wire for a spring has a surface roughness Rz of 10 μm or less, the steel wire has small surface irregularities, which facilitates the removal of lubricant from the surface thereof and thus facilitates a reduction in the amount of Ca or Na adhered. In addition, if the steel wire for a spring has a surface roughness Rz of 10 μm or less, there is a low frictional resistance between a coiling tool and the steel wire for a spring during coiling, thus further improving the coilability. If the steel wire for a spring has an oxide film on the surface thereof, the surface roughness Rz of the steel wire for a spring is synonymous with the surface roughness Rz of the oxide film; if the steel wire for a spring has no oxide film, the surface roughness Rz of the steel wire for a spring is the surface roughness Rz of the steel wire body. As used herein, "surface roughness Rz" refers to the maximum height (Rz) specified in JIS B 0601:2001.

(3) As one form of the steel wire for a spring, the area fraction of a ferrite phase in a cross-section taken in a direction orthogonal to the axial direction of the steel wire for a spring may be 30% or less in a surface region extending from the surface toward the center of the steel wire for a spring to a depth of 1.0% of the diameter of the steel wire for a spring.

If the area fraction of the ferrite phase is 30% or less in the surface region of the steel wire for a spring, decarburization is reduced. Thus, there is only a small decrease in surface hardness, and when the steel wire for a spring is used as a spring, a decrease in spring characteristics such as fatigue resistance and settling resistance can be effectively reduced while the strength characteristics are maintained. That is, the strength characteristics can be improved, and the spring characteristics can thereby be improved. Thus, the steel wire for a spring provides a spring with high strength and good fatigue resistance and settling resistance. If the steel wire for a spring has an oxide film on the surface thereof, the surface region of the steel wire for a spring does not include the oxide film. That is, the surface region of the steel wire for a spring in this case refers to a region extending from the surface toward the center of the steel wire body, excluding the oxide film, to a depth of 1.0% of the diameter of the steel wire body.

(4) As one form of the steel wire for a spring in (3) above, $C_B - C_A$ may satisfy 0.01% by mass or less, where $C_A$ is the C content of the surface region, and $C_B$ is the C content of a central region inside the surface region.

If the difference ($C_B - C_A$) between the carbon (C) content ($C_A$) of the surface region and the C content ($C_B$) of the central region of the steel wire for a spring satisfies 0.01% by mass or less, decarburization is sufficiently reduced. Thus, a decrease in surface hardness is further reduced. Accordingly, the strength characteristics can be further improved, and the spring characteristics can thereby be further improved.

(5) As one form of the steel wire for a spring, $H_B - H_A$ may satisfy 30 or less in terms of Vickers hardness, where $H_A$ is the surface hardness at a depth of 1.0% of the diameter of the steel wire for a spring from the surface toward the center of the steel wire for a spring in a cross-section taken in a direction orthogonal to the axial direction of the steel wire for a spring, and $H_B$ is the internal hardness at a depth of 25% of the diameter.

If the difference ($H_B - H_A$) between the surface hardness ($H_A$) at a depth of 1.0% of the diameter of the steel wire for a spring from the surface of the steel wire for a spring and the internal hardness ($H_B$) at a depth of 25% of the diameter satisfies 30 or less in terms of Vickers hardness, there is only a small decrease in surface hardness. That is, decarburization is reduced. Accordingly, the strength characteristics of the steel wire for a spring can be improved, and the spring characteristics can thereby be improved, thus providing a spring with high strength and good fatigue resistance and settling resistance. If the steel wire for a spring has an oxide film on the surface thereof, the surface hardness and the internal hardness of the steel wire for a spring are the surface hardness and the internal hardness of the portion of the steel wire for a spring excluding the oxide film, i.e., the surface hardness and the internal hardness of the steel wire body.

(6) As one form of the steel wire for a spring, the steel wire for a spring may have an oxide film on the surface thereof, and the oxide film has a thickness of from 1.0 μm to 20 μm.

If the oxide film has a thickness of 1.0 μm or more, the oxide film is effective in improving the lubricity and thus ensures stable lubricity during coiling, which results in increased coilability. However, as the oxide film becomes thicker, the oxide film tends to have a larger surface roughness Rz because of, for example, less uniform thickness and larger surface irregularities. Thus, it would be difficult to remove lubricant from the depressions in the oxide film, and it would therefore be difficult to reduce the amount of Ca or Na adhered. In addition, if the oxide film is too thick, the oxide film tends to crack and peel when the steel wire for a spring is formed into a spring and also impedes the nitriding of the steel wire during nitriding treatment after coiling. If the oxide film has a thickness of 20 μm or less, the oxide film has a small surface roughness Rz, which facilitates the removal of lubricant from the surface thereof and thus facilitates a reduction in the amount of Ca or Na adhered. In addition, if the oxide film has a thickness of 20 μm or less, the oxide film is resistant to peeling and also allows sufficient nitriding of the steel wire. A typical example of a steel wire for a spring having an oxide film on the surface thereof is an oil-tempered wire.

[Details of Embodiments of Invention]

Specific examples of steel wires for springs according to embodiments of the present invention will now be described. These examples, however, should not be construed as limiting the invention; rather, the invention is indicated by the claims, and all changes that come within the meaning and range of equivalency of the claims are intended to be embraced therein.

<Steel Wire for Spring>

Figure 1:
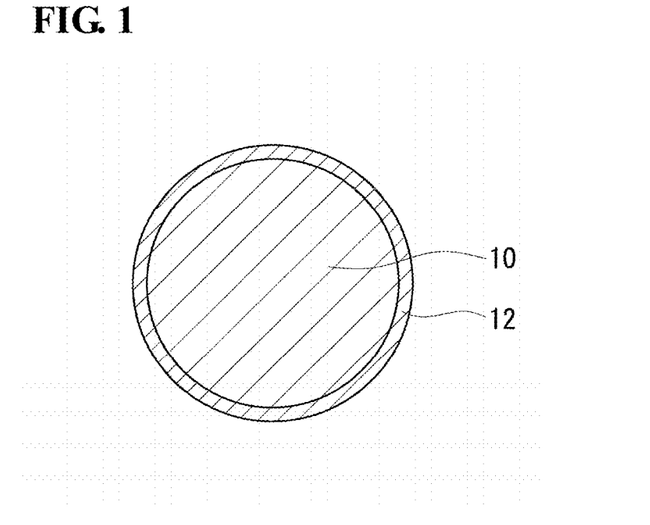
FIG. 1 is a schematic sectional view of a typical example of a steel wire for a spring according to an embodiment.

The structure of a steel wire for a spring according to an embodiment will now be described with reference to FIG. 1. FIG. 1 is a cross-sectional view taken in a direction orthogonal to the axial direction of the steel wire for a spring. The example steel wire for a spring shown in FIG. 1 is an oil-tempered wire and includes a steel wire body 10 and an oxide film 12 on the surface of the steel wire body 10. One of the features of the steel wire for a spring according to this embodiment is that the amount of Ca or Na adhered is 0.2 g/m$^2$ or less. The structure of the steel wire for a spring will now be described in detail.

The steel wire for a spring is manufactured by a process including a drawing step of drawing a steel material serving as a raw material to form a steel wire, a heat treatment step of heat-treating the drawn steel wire, and a cleaning step of cleaning the steel wire after drawing and before heat treatment. For thin steel wires for precision springs, drawing may be repeated to a predetermined wire diameter. In this case, intermediate heat treatment such as patenting treatment or annealing treatment may be performed during drawing as needed to remove work hardening due to drawing and thereby soften the steel wire.

That is, drawing and intermediate heat treatment are repeated, and a cleaning step is performed therebetween. For oil-tempered wires, the process includes the steps of drawing the steel material to a predetermined wire diameter, cleaning the steel wire, and quenching and tempering the steel wire after cleaning. Drawing and heat treatment such as patenting or quenching and tempering may be performed under known conditions. In the drawing step, a lubricant is applied for drawing. The lubricant used is a metallic soap containing a Ca or Na metal salt such as $Ca(OH)_2$, NaOH, or $Ca(C_{17}H_{35}COO)_2$. In the cleaning step, the steel wire is cleaned to remove lubricant from the surface of the steel wire.

Typically, the steel wire for a spring is an oil-tempered wire or a hard-drawn steel wire such as a piano wire or a hard steel wire. The steel wire for a spring may have a known chemical composition. Examples of types of steel include carbon steel, silicon-chromium steel, chromium-vanadium steel, and silicon-manganese steel. Steel wires containing these types of steel as major components and having cobalt or vanadium added thereto may also be used. Examples of types of oil-tempered wires include SWO-V, SWOSC-V, SWOCV-V, and SWOSM specified in JIS G 3560(1994) and JIS G 3561(1994). Examples of types of piano wires include SWRS72A and SWRS82A specified in JIS G 3502(2013). Examples of types of hard steel wires include SWRH72A and SWRH82A specified in JIS G 3506(2004).

The steel wire body 10 of the steel wire for a spring (oil-tempered wire) shown in FIG. 1 is a portion substantially formed of a steel component. The oxide film 12 is formed on the surface of the steel wire body 10 and contains, as a major component, iron (Fe) oxide formed by the oxidation of Fe in the steel component.

(Oxide Film)

The oxide film 12 on the surface of the steel wire for a spring (steel wire body 10) improves the lubricity of the surface of the steel wire for a spring, thus improving the coilability. The oxide film 12 is formed as the surface of the steel wire is oxidized by reaction with oxygen in the atmosphere during heat treatment such as patenting treatment or annealing treatment before or during drawing or quenching and tempering treatment after drawing, mainly during quenching and tempering treatment.

<Thickness>

The oxide film 12 may have a thickness of, for example, from 1.0 μm to 20 nm. If the oxide film 12 has a thickness of 1.0 μm or more, the oxide film 12 is effective in improving the lubricity and thus ensures stable lubricity when the steel wire for a spring is formed into a spring, which results in increased coilability. If the oxide film 12 has a thickness of 20 μm or less, the oxide film 12 has a small surface roughness Rz, which facilitates the removal of lubricant from the surface thereof and thus facilitates a reduction in the amount of Ca or Na adhered. In addition, if the oxide film 12 has a thickness of 20 μm or less, the oxide film is resistant to peeling during coiling and also allows sufficient nitriding of the steel wire during nitriding treatment after coiling. For example, the oxide film 12 preferably has a thickness of from 2.0 μm to 10 μm.

The thickness of the oxide film 12 can be adjusted by changing the conditions for the heat treatment mentioned above. For example, the thickness of the oxide film 12 can be adjusted by changing the oxygen concentration in the atmosphere for heat treatment, the heating temperature, and the heating time. The oxide film 12 tends to become thicker with increasing oxygen concentration, with increasing heating temperature, and with increasing heating time. The atmosphere for heat treatment may be an oxidizing atmosphere such as air. The heating temperature for patenting treatment may be, for example, from 800° C. to 1100° C., and the heating time may be from 20 seconds to 180 seconds. The heating temperature for quenching treatment may be, for example, from 900° C. to 1,050° C., and the heating time may be from 10 seconds to 180 seconds. The heating temperature for tempering treatment may be, for example, from 400° C. to 600° C., and the heating time may be from 30 seconds to 200 seconds.

The thickness of the oxide film 12 is measured by observing a cross-section taken in a direction orthogonal to the axial direction of the steel wire for a spring under a light microscope and measuring the actual thickness of the oxide film 12 in the cross-sectional observation image. Here, the thickness of the oxide film 12 is determined as the average of the thicknesses of the oxide film 12 measured at a plurality of points in the circumferential direction of the steel wire for a spring. The thickness of the oxide film 12 is measured at at least eight or more points.

(Surface Roughness)

The steel wire for a spring may have a surface roughness Rz of, for example, 10 μm or less. If the steel wire for a spring has a surface roughness Rz of 10 μm or less, the steel wire has small surface irregularities, which facilitates the removal of lubricant from the surface thereof and thus facilitates a reduction in the amount of Ca or Na adhered. In addition, if the steel wire for a spring has a surface roughness Rz of 10 μm or less, there is a low frictional resistance between a coiling tool and the steel wire for a spring during coiling, thus further improving the coilability. For example, the steel wire for a spring preferably has a surface roughness Rz of 8.0 μm or less. There is no particular lower limit to the surface roughness Rz of the steel wire for a spring; from the standpoint of manufacture, the steel wire for a spring may have a surface roughness Rz of, for example, 4.0 μm or more.

If the steel wire for a spring has the oxide film 12, as does the steel wire for a spring shown in FIG. 1 (oil-tempered wire), the surface roughness Rz of the steel wire for a spring is the surface roughness Rz of the oxide film 12. The surface roughness Rz of the oxide film 12 depends on the surface roughness of the steel wire body 10. In the drawing step, the surface roughness Rz of the steel wire body 10 can be reduced by repeatedly drawing the steel wire through a die so that the oxide film 12 has a surface roughness Rz of 10 μm or less, or 8.0 μm or less. After drawing, the surface roughness Rz can be further reduced by polishing the surface of the steel wire. If the steel wire (steel wire body 10) after drawing has a surface roughness Rz of 10 μm or less, the surface need not be polished after drawing, which results in a higher productivity.

The surface roughness Rz of the steel wire for a spring is determined as the average of the surface roughnesses Rz measured with a profilometer at a plurality of points in the circumferential direction at the same position in the axial direction of the steel wire. The surface roughness Rz of the steel wire for a spring is measured at at least eight or more points.

(Amount of Ca or Na Adhered)

The steel wire for a spring has Ca or Na adhered on the surface thereof in an amount of 0.2 $g/m^2$ or less. The Ca or Na adhered on the surface of the steel wire for a spring is derived from a component of the lubricant used when the steel wire is drawn. Since the amount of Ca or Na adhered is 0.2 $g/m^2$ or less, the steel wire for a spring has only a small amount of Ca or Na adhered thereto, thus exhibiting reduced decarburization. For example, the amount of Ca or Na adhered is preferably 0.1 $g/m^2$ or less, more preferably 0.05 $g/m^2$ or less.

(Cleaning Method)

The amount of Ca or Na adhered can be reduced by removing lubricant from the surface of the steel wire in the cleaning step. In the cleaning step, the steel wire may be cleaned with a kerosene-based cleaning oil, which allows the amount of Ca or Na adhered to be reduced to 0.2 $g/m^2$ or less.

It is also possible to remove lubricant from the surface of the steel wire by rinsing with water or by alkaline degreasing with an alkaline solution or acid degreasing with an acidic solution. However, it is difficult to remove lubricant from surface depressions by rinsing with water or degreasing because of their low cleaning power; thus, these methods cannot sufficiently remove lubricant from the surface of the steel wire. In addition, acid degreasing dissolves and corrodes the oxide film formed on the surface of the steel wire. In contrast, if the steel wire is cleaned with a kerosene-based cleaning oil, lubricant can be removed from surface depressions without the corrosion of the oxide film on the surface of the steel wire.

The steel wire may be cleaned, for example, by immersing the steel wire in a cleaning oil. Alternatively, lubricant can be effectively removed from the surface of the steel wire by ejecting a cleaning oil at high pressure onto the surface of the steel wire or by immersing the steel wire in a cleaning oil and exposing the steel wire to ultrasonic waves, so that lubricant can be sufficiently removed from surface depressions. To reduce the amount of Ca or Na adhered to 0.2 $g/m^2$ or less, it is preferred to perform at least one of high-pressure cleaning in which a cleaning oil is ejected at high pressure and ultrasonic cleaning in which the steel wire is immersed in a cleaning oil and is exposed to ultrasonic waves.

The amount of Ca or Na adhered can be measured by analyzing the surface of the steel wire for a spring for the amount of Ca or Na on the surface thereof with an inductively coupled plasma mass spectrometer (ICP-MS).

Here, the amount of Ca or Na adhered is determined as the average of the amounts of Ca or Na adhered that are measured at 20 or more points in the surface of the steel wire for a spring.

(Area Fraction of Ferrite Phase in Surface Region)

Figure 2:
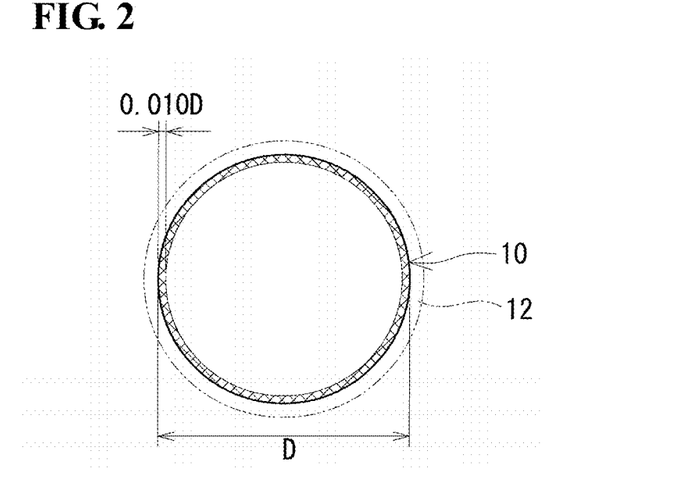
FIG. 2 illustrates the surface region and the central region of the steel wire for a spring according to the embodiment.

The area fraction of the ferrite phase in a cross-section of the steel wire for a spring may be 30% or less in a surface region extending from the surface toward the center of the steel wire for a spring (excluding the oxide film) to a depth of 1.0% of the diameter of the steel wire for a spring. Here, as shown in FIG. 2, "surface region" refers to a region extending from the surface of the steel wire body 10 of the steel wire for a spring to a depth of 0.010D (cross-hatched region), where D is the diameter of the steel wire body 10 excluding the oxide film 12. In FIG. 2, the hatching of the remaining region located inside the surface region is omitted for clarity. If the area fraction of the ferrite phase is 30% or less in the surface region of the steel wire for a spring (steel wire body 10), decarburization is reduced, and there is only a small decrease in surface hardness. Thus, when the steel wire for a spring is used as a spring, the strength characteristics can be improved, and the spring characteristics can thereby be improved. For example, the area fraction of the ferrite phase is preferably 20% or less, more preferably 10% or less, even more preferably 5% or less, in the surface region of the steel wire for a spring. Particularly preferably, the surface region is substantially free of the ferrite phase, and the area fraction of the ferrite phase is zero.

The area fraction of the ferrite phase may be determined by etching a cross-section of the steel wire for a spring, observing the surface region of the steel wire body under a light microscope, extracting the ferrite phase from the cross-sectional observation image, and calculating the area fraction thereof. Here, the area fraction of the ferrite phase is determined as the average of the area fractions of the ferrite phase measured at eight or more points in the surface region.
(Difference in C Content Between Surface Region and Central Region)

$C_B$–$C_A$ may satisfy 0.01% by mass or less, where $C_A$ is the C content of the surface region, and $C_B$ is the C content of the central region inside the surface region. Here, "central region" refers to the remaining region (region without hatching) located inside the surface region in FIG. 2. If the difference ($C_B$–$C_A$) between the C content ($C_A$) of the surface region and the C content ($C_B$) of the central region of the steel wire for a spring (steel wire body 10) satisfies 0.01% by mass or less, decarburization is sufficiently reduced. Thus, a decrease in surface hardness is further reduced. Accordingly, the strength characteristics can be further improved, and the spring characteristics can thereby be further improved. The difference ($C_B$–$C_A$) in C content between the surface region and the central region of the steel wire for a spring is preferably less than 0.01% by mass.

The C contents of the surface region and the central region may be measured by analyzing a cross-section of the steel wire for a spring with an electron probe micro-analyzer (EPMA) for the amount of carbon in each region of the steel wire body. Here, the C content is determined as the average of the C contents measured at eight or more points in each region.

(Difference Between Surface Hardness and Internal Hardness)

Figure 3:
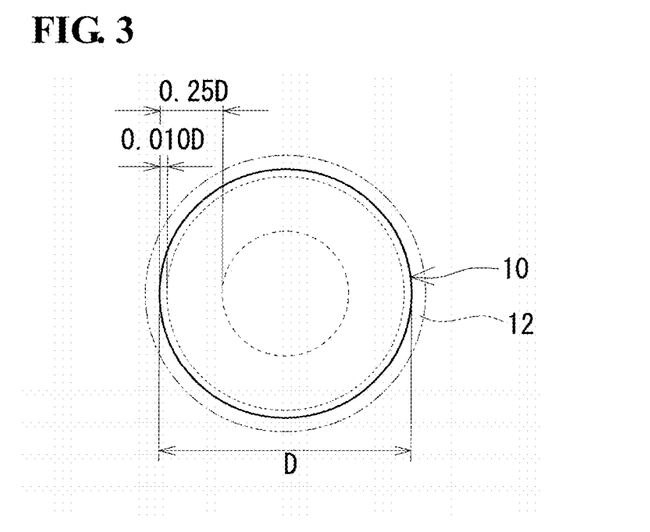
FIG. 3 illustrates the surface hardness and the internal hardness of the steel wire for a spring according to the embodiment.

$H_B$–$H_A$ may satisfy 30 or less in terms of Vickers hardness, where $H_A$ is the surface hardness at a depth of 1.0% of the diameter of the steel wire for a spring (excluding the oxide film) from the surface toward the center of the steel wire for a spring in a cross-section of the steel wire for a spring, and $H_B$ is the internal hardness at a depth of 25% of the diameter. Here, as shown in FIG. 3, "surface hardness" refers to the Vickers hardness at a depth of 0.010D from the surface of the steel wire body 10 of the steel wire for a spring (at the position indicated by the dotted line), and "internal hardness" refers to the Vickers hardness at a depth of 0.25D from the surface of the steel wire body 10 (at the position indicated by the broken line), where D is the diameter of the steel wire body 10 excluding the oxide film 12. In FIG. 3, hatching for indicating a cross-section is omitted for clarity. If the difference ($H_B$–$H_A$) between the surface hardness ($H_A$) and the internal hardness ($H_B$) of the steel wire for a spring (steel wire body 10) satisfies 30 or less in terms of Vickers hardness, there is only a small decrease in surface hardness. Thus, when the steel wire for a spring is used as a spring, the strength characteristics can be improved, and the spring characteristics can thereby be improved. For example, the difference ($H_B$–$H_A$) between the surface hardness ($H_A$) and the internal hardness ($H_B$) of the steel wire for a spring is preferably 20 or less, more preferably 10 or less.

The surface hardness and the internal hardness of the steel wire for a spring may be determined by measuring the Vickers hardness at each depth in a cross-section of the steel wire for a spring (steel wire body). Here, the surface hardness and the internal hardness are determined as the average of the Vickers hardnesses measured at eight or more points at each depth.

(Lubricating Coating)

Figure 4:
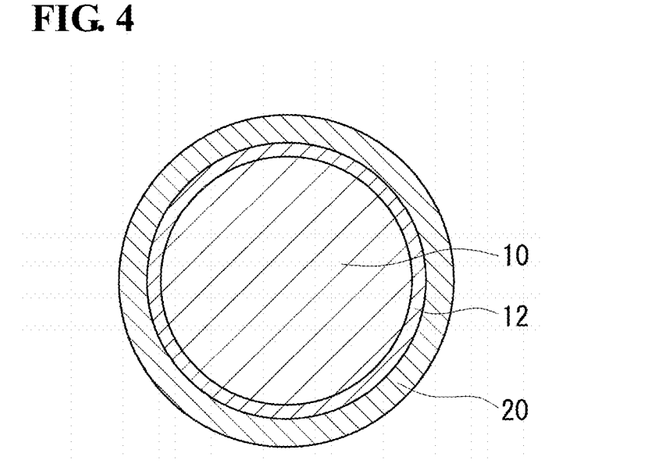
FIG. 4 is a schematic sectional view of another example of the steel wire for a spring according to the embodiment.

As shown in FIG. 4, the steel wire for a spring may have on the surface thereof a lubricating coating 20 containing a lubricating resin as a major component. The lubricating resin is primarily intended to impart lubricity to the surface of the steel wire for a spring. The lubricating resin may be at least one resin selected from polyacetals, polyimides, melamine resins, acrylic resins, and fluorocarbon resins. The lubricating coating 20 on the surface of the steel wire for a spring improves the lubricity of the surface of the steel wire for a spring, thus improving the coilability. As used herein, "major component" refers to a component that is present in the largest amount by mass of all components present in the lubricating coating 20. Fluorocarbon resins include polychlorotrifluoroethylene (PCTFE) and polytetrafluoroethylene (PTFE). The lubricating coating 20 may optionally contain other components such as antiseptics. An example of an antiseptic is boric acid.

(Method for Forming Lubricating Coating)

The lubricating coating 20 is formed by applying a coating material containing a lubricating resin to the surface of the steel wire for a spring after the final step (e.g., after quenching and tempering treatment). For example, the lubricating coating 20 can be formed using a coating solution prepared by mixing and dispersing a lubricating resin in water as a coating material by applying the coating material to the surface of the steel wire for a spring and then drying the coating. Examples of coating methods that may be used include dipping, in which the steel wire for a spring is dipped in a coating solution, and spraying, in which the surface of the steel wire for a spring is sprayed with a coating solution.

(Lubricating Oil)

A lubricating oil (not shown) may be further applied to the surface of the steel wire for a spring. A lubricating oil applied to the surface of the steel wire for a spring not only improves the coilability, but is also expected to prevent the corrosion of the steel wire. As shown in FIG. 4, if the steel wire for a spring has the lubricating coating 20 on the surface thereof, the lubricating oil may be applied to the surface of the lubricating coating 20. The lubricating oil is applied after the final step (e.g., after quenching and tempering treatment). Examples of lubricating oils that may be used include gear oils, mineral oils, and vegetable oils.

Test Example 1

An oil-tempered wire of Sample No. 1-1 was manufactured by drawing a silicon-chromium steel (SWOSC-V) material to form a steel wire with a wire diameter of 3.0 mm, cleaning the steel wire, and quenching and tempering the steel wire. Drawing was performed using a metallic soap containing $Ca(OH)_2$ and $Ca(C_{17}H_{35}COO)_2$ as a lubricant. Cleaning was performed by immersing the steel wire in a kerosene-based cleaning oil and subjecting the steel wire to ultrasonic cleaning. Quenching treatment was performed by heating in air at 1,020° C. for 100 seconds. Tempering treatment was performed by heating in air at 500° C. for 150 seconds.

The thickness of the oxide film and the surface roughness Rz of the oil-tempered wire of Sample No. 1-1 were measured. The thickness of the oxide film was actually measured by observing a cross-section of the oil-tempered wire under a light microscope. Here, the thickness of the oxide film was determined as the average of the thicknesses of the oxide film measured at eight points spaced at equal intervals in the circumferential direction of the oil-tempered wire. The surface roughness Rz of the oil-tempered wire was measured over a standard length taken in the axial direction of the oil-tempered wire with a profilometer (Surftest SV-2100 from Mitutoyo Corporation) in accordance with JIS B 0601. Here, the surface roughness Rz of the oil-tempered wire was determined as the average of the surface roughnesses Rz measured at eight points spaced at equal intervals in the circumferential direction of the oil-tempered wire. As a result, the thickness of the oxide film was 5 μm, and the surface roughness Rz of the oil-tempered wire (oxide film) was 8 μm.

For comparison, an oil-tempered wire of Sample No. 1-2 was manufactured in the same manner as the oil-tempered wire of Sample No. 1-1 except that the steel wire after drawing was cleaned by rinsing with water. The thickness of the oxide film and the surface roughness Rz of the oil-tempered wire of Sample No. 1-2 were measured in the same manner as the oil-tempered wire of Sample No. 1-1. The thickness of the oxide film and the surface roughness Rz were similar to those of Sample No. 1-1.

The thus-manufactured oil-tempered wires of Sample Nos. 1-1 and 1-2 were evaluated as follows.

(Surface Condition of Steel Wire after Cleaning)

Figure 5:
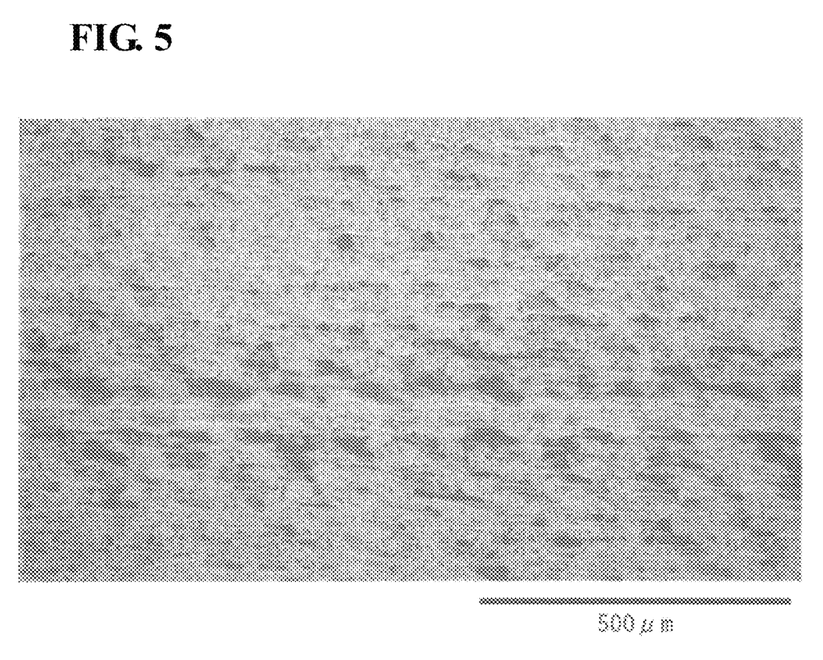
FIG. 5 shows an SEM observation image of the surface of an oil-tempered wire of Sample No. 1-1 after cleaning.
Figure 6:
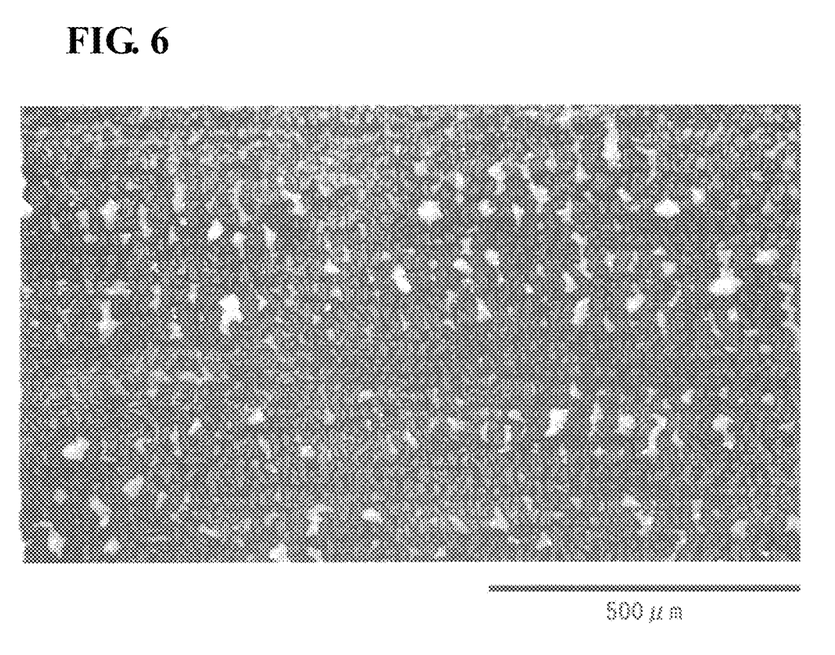
FIG. 6 shows an SEM observation image of the surface of an oil-tempered wire of Sample No. 1-2 after cleaning.

The surface condition of each steel wire after cleaning and before quenching and tempering treatment was examined for the presence of lubricant adhered on the surface thereof by observation under a scanning electron microscope (SEM). The results of the SEM observation of the surfaces of the oil-tempered wires of Sample Nos. 1-1 and 1-2 after cleaning are shown in FIGS. 5 and 6. As a result, as shown in FIG. 5, no lubricant was found on the oil-tempered wire of Sample No. 1-1, indicating that the lubricant was removed. In contrast, as shown in FIG. 6, some lubricant (white spots in the figure) was found in the depressions in the surface of the oil-tempered wire of Sample No. 1-2, indicating that the lubricant remained.

(Amount of Ca or Na Adhered)

The amount of Ca or Na adhered on the surface of each oil-tempered wire was evaluated. Specifically, the amount of Ca adhered from the lubricant used for drawing was evaluated. The amount of Ca adhered was measured by analyzing the surface of the oil-tempered wire for the amount of Ca on the surface thereof with an ICP-MS. Here, the amount of Ca adhered was determined as the average of the amounts of Ca adhered that were measured at 20 points in the surface of the oil-tempered wire. The results are summarized in Table 1.

Figure 7:
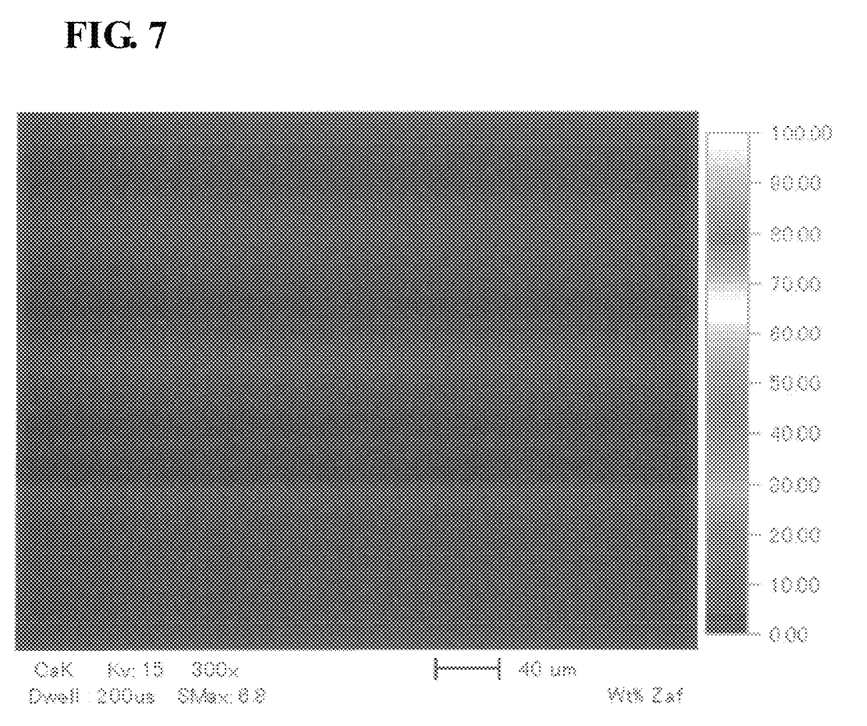
FIG. 7 shows an EDX mapping of Ca on the surface of the oil-tempered wire of Sample No. 1-1.
Figure 8:
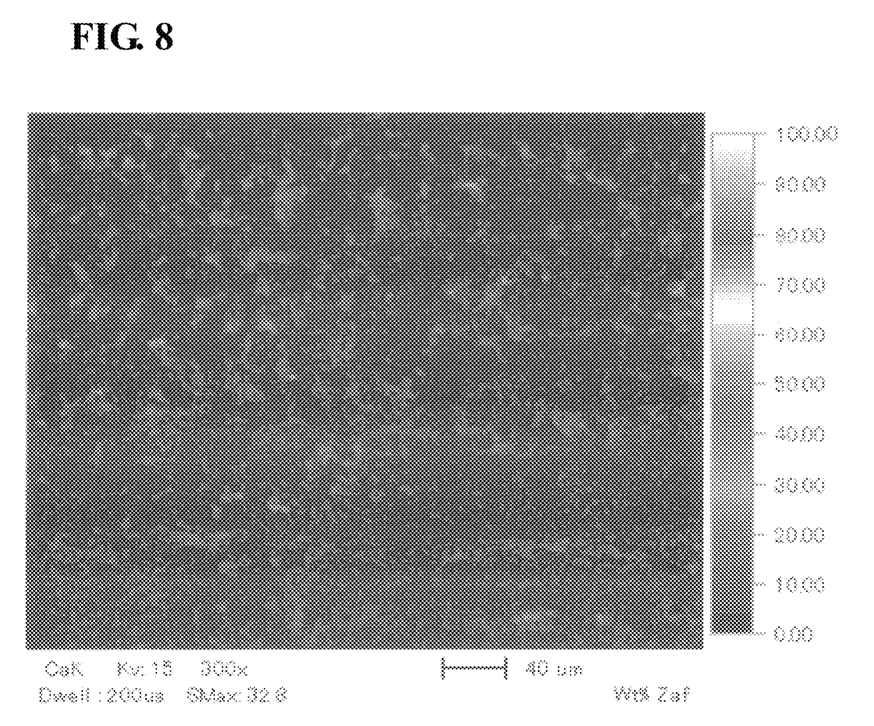
FIG. 8 shows an EDX mapping of Ca on the surface of the oil-tempered wire of Sample No. 1-2.

The surface of each oil-tempered wire was also examined for the concentration distribution of Ca on the surface thereof by spot analysis with an energy-dispersive fluorescence X-ray spectrometer (EDX). The results of the EDX analysis for the concentration of Ca on the surfaces of the oil-tempered wires of Sample Nos. 1-1 and 1-2 are shown in FIGS. 7 and 8. As a result, as shown in FIG. 7, substantially no Ca was detected on the oil-tempered wire of Sample No. 1-1. In contrast, the white spots in FIG. 8 are the areas where Ca was detected on the oil-tempered wire of Sample No. 1-2, and the remaining dark-gray area is the area where no Ca was detected, indicating that much Ca was detected.

(Area Fraction of Ferrite Phase in Surface Region)

The area fraction of the ferrite phase in the surface region of each oil-tempered wire was evaluated. The area fraction of the ferrite phase was determined by etching a cross-section of the oil-tempered wire, observing the surface region of the steel wire body excluding the oxide film under a light microscope, extracting the ferrite phase from the cross-sectional observation image, and calculating the area fraction thereof. Here, the area fraction of the ferrite phase was determined as the average of the area fractions of the ferrite phase calculated at eight points spaced at equal intervals in the circumferential direction of the surface region. The results are summarized in Table 1.

(Difference in C Content Between Surface Region and Central Region)

The difference ($C_B$–$C_A$) between the C content ($C_A$) of the surface region and the C content ($C_B$) of the central region of each oil-tempered wire was evaluated. The C contents $C_A$ and $C_B$ of the surface region and the central region were measured by analyzing a cross-section of the oil-tempered wire with an EPMA for the amount of carbon in each region of the steel wire body excluding the oxide film. Here, the C content of each region was determined as the average of the C contents measured at eight points spaced at equal intervals in the circumferential direction. The results are summarized in Table 1. In the table, "<0.01" in "$C_B$–$C_A$ (%)" means that the difference ($C_B$–$C_A$) in C content between the surface region and the central region of the steel wire for a spring was not more than the detection limit, that is, less than 0.01.

(Difference Between Surface Hardness and Internal Hardness)

The difference ($H_B$–$H_A$) between the surface hardness ($H_A$) and the internal hardness ($H_B$) in a cross-section of each oil-tempered wire were evaluated. The surface hardness $H_A$ and the internal hardness $H_B$ of each oil-tempered wire were determined by measuring the Vickers hardness (HV) with a Vickers hardness tester at each depth in a cross-section of the oil-tempered wire (the steel wire body excluding the oxide film). Here, the surface hardness and the internal hardness were determined as the average of the Vickers hardnesses measured at eight points spaced at equal intervals in the circumferential direction at each depth. The results are summarized in Table 1.

TABLE 1

| Sample No. | Amount of Ca deposited (g/m²) | Area fraction of ferrite phase (%) | $C_B$-$C_A$ (% by mass) | $H_B$-$H_A$ (HV) |
|---|---|---|---|---|
| 1-1 | 0.05 | 0 | <0.01 | 5 |
| 1-2 | 0.80 | 30 | 0.02 | 30 |

As can be seen from the results shown in Table 1, for Sample No. 1-1, which had Ca adhered thereto in an amount of not more than 0.2 g/m², the area fraction of the ferrite phase in the surface region was not more than 30%, and the difference ($C_B$–$C_A$) in C content between the surface region and the central region satisfied not more than 0.01% by mass, indicating that decarburization due to quenching and tempering treatment was effectively reduced. In addition, since decarburization was reduced, there was only a small decrease in surface hardness; that is, the difference ($H_B$–$H_A$) between the surface hardness and the internal hardness satisfied not more than 30 in terms of Vickers hardness. In contrast, for Sample No. 1-2, which had Ca adhered thereto in an amount of more than 0.2 g/m², the area fraction of the ferrite phase in the surface region was increased as compared to Sample No. 1-1, and there was a large difference ($C_B$–$C_A$) in C content between the surface region and the central region, i.e., more than 0.01% by mass, indicating that decarburization occurred. For Sample No. 1-2, there was also a large difference ($H_B$–$H_A$) between the surface hardness and the internal hardness of the steel wire due to decarburization.

Test Example 2

A piano wire with a wire diameter of 1.6 mm was manufactured by repeatedly drawing and patenting an SWRS72A piano wire specified in JIS G 3502 and cleaning the piano wire after drawing and before patenting treatment. Drawing was performed using a metallic soap containing Ca(OH)$_2$ and Ca(C$_{17}$H$_{35}$COO)$_2$ as a lubricant. Cleaning was performed by immersing the steel wire in a kerosene-based cleaning oil and subjecting the steel wire to ultrasonic cleaning. Patenting treatment was performed by heating the steel wire to 900° C. in an inert gas atmosphere and then immersing the steel wire in a molten lead bath at 550° C. for 10 seconds to cause isothermal transformation. The resulting piano wire had no oxide film on the surface thereof. The surface roughness Rz of the piano wire was measured in the same manner as that of Sample No. 1-1 in Test Example 1. The surface roughness Rz was 7.5 μm. This piano wire is referred to as Sample No. 2-1.

A piano wire of Sample No. 2-2 was manufactured in the same manner as the piano wire of Sample No. 2-1 except that the cleaning method was changed to rinsing with water. As with the piano wire of Sample No. 2-1, the piano wire of Sample No. 2-2 had no oxide film, and the surface roughness Rz was also similar to that of Sample No. 2-1.

The thus-manufactured piano wires of Sample Nos. 2-1 and 2-2 were evaluated as in Test Example 1 for the amount of Ca or Na adhered, the area fraction of the ferrite phase in the surface region, the difference ($C_B$-$C_A$) in C content between the surface region and the central region, and the difference ($H_B$-$H_A$) between surface hardness ($H_A$) and internal hardness ($H_B$). The results are summarized in Table 2.

The piano wires of Sample Nos. 2-1 and 2-2 were also evaluated for coilability. For coilability evaluation, 10,000 precision springs with a free length of 30.0 mm, an average spring diameter of 15.0 mm, and a total number of turns of 6.5 were fabricated, and the dispersion (average and standard deviation) of the free length of the thus-fabricated precision springs was determined. The results are summarized in Table 2.

TABLE 2

| Sample No. | Amount of Ca deposited (g/m²) | Area fraction of ferrite phase (%) | $C_B$ - $C_A$ (% by mass) | $H_B$ - $H_A$ (HV) | Average free length (mm) | Standard deviation |
|---|---|---|---|---|---|---|
| 2-1 | 0.05 | 0 | <0.01 | 4 | 30.08 | 0.06 |
| 2-2 | 0.88 | 35 | 0.03 | 35 | 30.21 | 0.14 |

As can be seen from the results shown in Table 2, for Sample No. 2-1, which had Ca adhered thereto in an amount of not more than 0.2 g/m², the area fraction of the ferrite phase in the surface region was not more than 30%, and the difference ($C_B$-$C_A$) in C content between the surface region and the central region satisfied not more than 0.01% by mass, indicating that decarburization was effectively reduced. In addition, since decarburization was reduced, there was only a small decrease in surface hardness; that is, the difference ($H_B$-$H_A$) between the surface hardness and the internal hardness satisfied not more than 30 in terms of Vickers hardness. In contrast, for Sample No. 2-2, which had Ca adhered thereto in an amount of more than 0.2 g/m², the area fraction of the ferrite phase in the surface region was increased as compared to Sample No. 2-1, and there was a large difference ($C_B$-$C_A$) in C content between the surface region and the central region, i.e., more than 0.01% by mass, indicating that decarburization occurred. For Sample No. 2-2, there was also a large difference ($H_B$-$H_A$) between the surface hardness and the internal hardness of the steel wire due to decarburization.

Furthermore, for Sample No. 2-1, the average spring free length satisfied 30.0±0.1 mm, and the standard deviation was not more than 0.10, indicating that the dispersion of the spring free length was smaller and the coilability was better than those of Sample No. 2-2.

REFERENCE SIGNS LIST

10 steel wire body
12 oxide film
20 lubricating coating

The invention claimed is:

1. A steel wire for a spring, having a non-zero amount of Ca adhered thereto in an amount of 0.2 g/m² or less or having a non-zero amount of Na adhered thereto in an amount of 0.2 g/m² or less, wherein
the steel wire has an oxide film on a surface thereof, and the oxide film has a thickness of from 2.0 μm to 20 μm.

2. The steel wire for a spring according to claim 1, wherein the oxide film has a surface roughness Rz of 10 μm or less.

3. The steel wire for a spring according to claim 1, wherein an area fraction of a ferrite phase in a cross-section taken in a direction orthogonal to an axial direction of the steel wire for a spring is 30% or less in a surface region extending from a surface toward a center of the steel wire for a spring to a depth of 1.0% of a diameter of the steel wire for a spring.

4. The steel wire for a spring according to claim 3, wherein $C_B$-$C_A$ satisfies 0.01% by mass or less, where $C_A$ is a C content of the surface region, and $C_B$ is a C content of a central region inside the surface region.

5. The steel wire for a spring according to claim 1, wherein $H_B$-$H_A$ satisfies 30 or less in terms of Vickers hardness, where $H_A$ is a surface hardness at a depth of 1.0% of a diameter of the steel wire for a spring from a surface toward a center of the steel wire for a spring in a cross-section taken in a direction orthogonal to an axial direction of the steel wire for a spring, and $H_B$ is an internal hardness at a depth of 25% of the diameter.

* * * * *